(12) United States Patent
He et al.

(10) Patent No.: US 11,822,086 B2
(45) Date of Patent: Nov. 21, 2023

(54) LIGHTGUIDE BASED ILLUMINATOR FOR REFLECTIVE DISPLAY PANEL

(71) Applicant: Meta Platforms Technologies, LLC, Menlo Park, CA (US)

(72) Inventors: Sihui He, Sunnyvale, CA (US); Wanli Chi, Sammamish, WA (US); Ying Geng, Bellevue, WA (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 26 days.

(21) Appl. No.: 17/667,504

(22) Filed: Feb. 8, 2022

(65) Prior Publication Data
US 2023/0251486 A1    Aug. 10, 2023

(51) Int. Cl.
*G02B 27/00* (2006.01)
*G02B 27/01* (2006.01)
*F21V 8/00* (2006.01)
*G06F 3/01* (2006.01)
*G06T 19/00* (2011.01)

(52) U.S. Cl.
CPC ....... *G02B 27/0172* (2013.01); *G02B 6/0016* (2013.01); *G02B 27/0093* (2013.01); *G06F 3/013* (2013.01); *G02B 2027/0138* (2013.01); *G06T 19/006* (2013.01)

(58) Field of Classification Search
CPC .............. G02B 27/0172; G02B 6/0016; G02B 27/0093; G02B 2027/0138; G06F 3/013; G06T 19/006
See application file for complete search history.

(56) References Cited

U.S. PATENT DOCUMENTS

| 6,864,861 B2 | 3/2005 | Schehrer et al. |
| 10,845,526 B1 * | 11/2020 | Lee ........................ G02B 6/0016 |
| 10,845,538 B2 * | 11/2020 | Shipton .............. G02B 27/0081 |

(Continued)

FOREIGN PATENT DOCUMENTS

| CN | 108717235 A | 10/2018 |
| WO | 2021103271 A1 | 6/2021 |
| WO | WO-2021262641 A1 * | 12/2021 |

OTHER PUBLICATIONS

Kress, B. C. (Jul. 2019). Optical waveguide combiners for AR headsets: features and limitations. In Digital Optical Technologies 2019 (vol. 11062, pp. 75-100). SPIE.*

(Continued)

*Primary Examiner* — Sarah Lhymn
(74) *Attorney, Agent, or Firm* — Pequignot + Myers; Matthew A. Pequignot

(57) ABSTRACT

A see-through illuminator for a reflective display panel provides a better image contrast when the illuminator is configured to direct a leakage light beam exiting the lightguide from a side opposing the display panel to propagate non-parallel to an image light formed by reflection of an illuminating light beam from the display panel. An objective lens may concentrate the image and leakage light beams at different locations, enabling a user's eye placed at a location of the image light beam to see the projected image without interference from the leakage light beam.

18 Claims, 11 Drawing Sheets

(56) References Cited

U.S. PATENT DOCUMENTS

| | | | | |
|---|---|---|---|---|
| 2012/0127573 A1* | 5/2012 | Robinson | ............ | G02B 6/0048 |
| | | | | 359/464 |
| 2015/0168651 A1* | 6/2015 | Nishiwaki | ............ | H01L 31/054 |
| | | | | 250/237 R |
| 2019/0086674 A1* | 3/2019 | Sinay | ................... | G06T 19/006 |
| 2020/0301239 A1 | 9/2020 | Akkaya et al. | | |
| 2020/0371388 A1 | 11/2020 | Geng et al. | | |

OTHER PUBLICATIONS

Chen, C. F., Wang, H. T., & Chen, C. H. (2008). High throughput reflective light guide for planar illuminator. Applied optics, 47(6), 784-791.*

International Search Report and Written Opinion for International Application No. PCT/US2023/012383, dated Jun. 16, 2023, 11 pages.

* cited by examiner

LIGHTGUIDE BASED ILLUMINATOR FOR REFLECTIVE DISPLAY PANEL

TECHNICAL FIELD

The present disclosure relates to diffractive optical elements and related optical systems and methods.

BACKGROUND

Visual display systems provide information to viewer(s) including still images, video, data, etc. Visual displays have applications in diverse fields including entertainment, education, engineering, science, training, advertising, to name just a few examples. Some visual displays, such as TV sets, display images to several users, while some visual display systems, such s near-eye displays (NEDs), are intended for use by individual viewers. NEDs wearable on the user's head may be self-contained, or may be connected to a controller or a console providing the video feed and/or required control functions.

An artificial reality system may include an NED (e.g., a headset or a pair of glasses) configured to present content to a user. The NED may display virtual objects or combine images of real objects with virtual objects in virtual reality (VR), augmented reality (AR), or mixed reality (MR) applications. For example, in an AR system, a user may view images of virtual objects (e.g., computer-generated images) superimposed with the surrounding environment by seeing through a "combiner" component. The combiner of a wearable display is typically transparent to external light but includes some light routing optic to place the display-generated images into the user's field of view.

Because a display of HMD is worn on the head of a user, a large, bulky, unbalanced, and/or heavy display device would be cumbersome and uncomfortable for the user to wear. Consequently, head-mounted display devices can benefit from a compact and efficient configuration, including efficient light sources and illuminators providing illumination of a display panel, high-throughput ocular lenses, reflectors, diffractive optical elements, and other compact optical elements in the image forming train. The compact optical elements, while being lightweight and convenient to use, may suffer from optical aberrations, image artifacts, reduced contrast, rainbowing, ghosting, throughput non-uniformity, and other defects.

BRIEF DESCRIPTION OF THE DRAWINGS

Exemplary embodiments will now be described in conjunction with the drawings, in which.

DETAILED DESCRIPTION

Figure 1A:
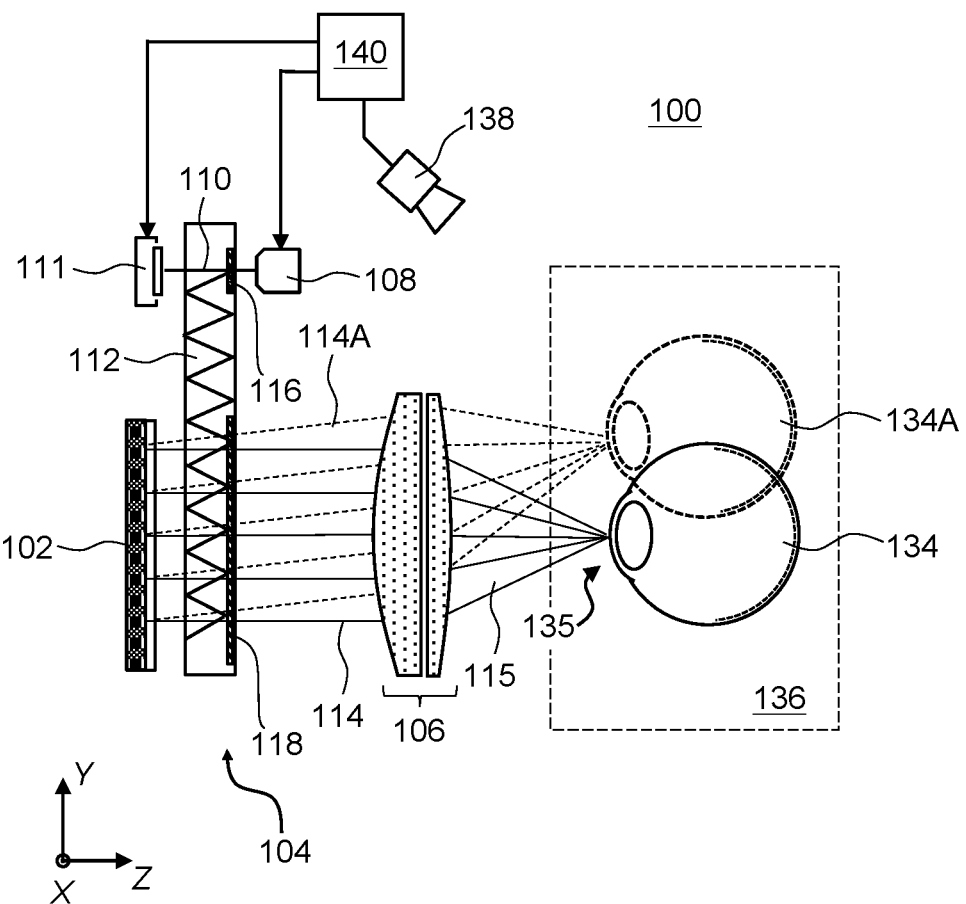
FIG. 1A is a schematic side view of a display apparatus including a reflective display panel illuminated with s lightguide and a tiltable reflector for redirecting the illumination to the eye location.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A display apparatus may include a reflective display panel illuminated with a light source. A lightguide carrying the illuminating light to the reflective display panel may be disposed in the optical path of the image carrying light, such that an image displayed on the reflective display panel is viewed through the lightguide. A portion of illuminating light leaked by the lightguide towards the viewer may reduce the contrast of the image displayed by the display panel.

In accordance with this disclosure, the display apparatus may be configured to cause the leakage light to propagate at an angle to the image light, i.e. non-parallel to the image light. In near-eye display configurations including an ocular optical element for viewing the reflective display panel from a close distance, the non-parallelism of the image and causes the leakage light to be focused in a different area of an eyebox than the image light. Herein, the term "eyebox" means a geometrical area where a viewer's eye may be placed in order to view the image generated by the near-eye display. An eye tracking system may be employed to make the image light follow the location of the eye at the eyebox, which causes the leakage light to always miss the viewer's eye, improving overall image contrast and clarity.

The divergence of the image and leakage light beams w.r.t. each other may be provided e.g. by tilting the lightguide, by providing a transmission diffraction grating in an optical path between the lightguide and the reflective display panel that deviates the illuminating light, by providing a reflective array of micromirrors that deviate the impinging illuminating light beam at an angle different from the angle of incidence of the illuminating beam on the array, etc. The redirecting transmission diffraction grating may be polarization-selective in some embodiments.

In accordance with the present disclosure, there is provided a display apparatus comprising a reflective display panel and an illuminator for illuminating the reflective display panel. The illuminator comprises a light source for providing an illuminating light beam, and a lightguide for expanding the illuminating light beam across the reflective display panel. The reflective display panel reflects the illuminating light beam thereby forming an image light beam that propagates through the lightguide. A leakage light beam formed in the lightguide from the illuminating light beam co-propagates with the image light beam away from the lightguide and towards an eyebox of the display apparatus. The display apparatus further includes an objective for receiving the image light beam propagated through the lightguide for forming an image at the eyebox. The illuminator is configured to direct the leakage light beam exiting the lightguide towards the eyebox to propagate non-parallel to the image light beam, whereby locations of the image and leakage light beams at the eyebox do not overlap anywhere at the eyebox.

In some embodiments, the reflective display panel and the lightguide are non-parallel to each other. In some embodiments, the illuminator further comprises a transmissive diffraction grating in an optical path between the lightguide and the reflective display panel, for redirecting the illuminating light beam to impinge onto the reflective display panel at a substantially normal angle. In embodiments where the transmissive diffraction grating is configured to redirect light differently depending on a polarization state of impinging light, the illuminating light beam may be in a first polarization state, and the image light beam is in a second, orthogonal polarization state.

The reflective display panel may include an array of tiltable micromirrors and/or a liquid crystal panel. In embodiments where the reflective display panel includes the array of tiltable micromirrors, the latter may be disposed parallel to the lightguide while the tiltable micromirrors at their nominal orientations may remain not parallel to a plane of the array of tiltable micromirrors. The illuminator may further comprise a waveplate between the reflective display panel and the lightguide, for causing the illuminating and image light beams to have mutually orthogonal polarization states, whereby the leakage and image light beams have mutually orthogonal polarization states. A polarizer may be disposed downstream of the lightguide for attenuating the leakage light beam while propagating the image light beam towards the objective.

In embodiments where the lightguide comprises a pupil-replicating lightguide, the latter may include an in-coupling grating for in-coupling the illuminating light beam into the pupil-replicating lightguide, and an out-coupling grating for out-coupling parallel portions of the illuminating light beam out of the pupil-replicating lightguide, thereby expanding the illuminating light beam across the reflective display panel. The out-coupling grating may be configured to diffract light of a first polarization state and to not diffract light of a second, orthogonal polarization state.

In some embodiments, the display apparatus further comprises a tiltable reflector in an optical path between the light source and the lightguide, for receiving the illuminating light beam from the light source and redirecting the illuminating light beam towards the lightguide at a variable incidence angle, thereby varying an angle of incidence of the image light beam onto the objective and a location of the image light beam at the eyebox. The locations of the image and leakage light beams at the eyebox do not overlap at any angle of tilt of the tiltable reflector. The display apparatus may further include an eye tracker for determining a position a user's eye pupil at the eyebox, and a controller operably coupled to the eye tracker and the tiltable reflector for directing the image light beam to the position of the user's eye pupil.

In accordance with the present disclosure, there is provided an illuminator comprising a light source for providing an illuminating light beam, and a pupil-replicating lightguide for expanding the illuminating light beam. The pupil-replicating lightguide may include an out-coupling grating for out-coupling parallel portions of the illuminating light beam out of the pupil-replicating lightguide, thereby expanding the illuminating light beam. A transmission diffraction grating may be disposed and configured to redirect the portions of the illuminating light beam out-coupled from the pupil-replicating lightguide by the out-coupling grating. At least one of the out-coupling grating or the transmission diffraction grating may be polarization-selective.

In accordance with the present disclosure, there is further provided a method for illuminating a reflective display panel. The method comprises providing an illuminating light beam, expanding an illuminating light beam across the reflective display panel using a lightguide, and reflecting the illuminating light beam by the reflective display panel thereby forming an image light beam that propagates through the lightguide. A leakage light beam formed in the lightguide from the illuminating light beam co-propagates with the image light beam away from the lightguide and towards an eyebox. The leakage and image light beams propagate towards the eyebox non-parallel to one another, whereby locations of the image and leakage light beams at the eyebox do not overlap anywhere at the eyebox.

The method may further include disposing the reflective display panel and the lightguide non-parallel to each other. The method may further include redirecting, using a transmission diffraction grating, the illuminating light beam to impinge onto the reflective display panel at a substantially normal angle. In some embodiments, the method further includes using a waveplate disposed between the reflective display panel and the lightguide to cause the illuminating and image light beams to have mutually orthogonal polarization states, whereby the leakage and image light beams have mutually orthogonal polarization states.

Referring now to FIG. 1A, a display apparatus 100 includes a reflective display panel 102, an illuminator 104, and an objective 106, also termed ocular element or lens or a projection element or lens. The illuminator 104 includes a light source 108 providing an illuminating light beam 110, and a lightguide 112 for expanding the illuminating light beam 110 along the reflective display panel 102. The reflective display panel 102 reflects the illuminating light beam 110 with spatially variant reflectivity, forming an image light beam 114 that propagates through the lightguide 112 towards the objective 106, i.e. in the direction of Z-axis in FIG. 1A. The objective 106 focuses the image light beam 114, producing a converging image light beam 115 carrying an image in angular domain to an eyebox 136 for direct observation by a user's eye 134 at the eyebox 136. Herein, the term "image in angular domain" means an image where which different elements of the image (i.e. pixels of the image) are represented by angles of corresponding rays of the converging image light beam 115, the rays carrying optical power levels and/or color composition corresponding to brightness and/or color values of the image pixels. The objective 106 may be e.g. a lens, such as a pancake lens, a reflective element, a reflective/refractive element combination, etc.

The illuminating light beam 110 may be coupled into the lightguide 112 by an in-coupling grating 116, which may receive the illuminating light beam 110 directly from the light source 108, or via a tiltable reflector 111 shown in FIG. 1A, e.g. a microelectromechanical system (MEMS) tiltable reflector. The tiltable reflector 110 is disposed in an optical path between the light source 108 and the lightguide 112. The display apparatus 100 may further include an eye tracker 138 that determines at least one of position or orientation of the user's eye 134 in the eyebox 136, which may be used e.g. to determine a position of a pupil 135 pupil of the user's eye 134. A controller 140 may be operably coupled to the eye tracker 138 and the tiltable reflector 110 for directing the converging image light beam 115 to the position of the user's eye pupil 135, as the user's eye 134 moves or changes its orientation.

In operation, the tiltable reflector 111 receives the illuminating light beam 110 from the light source 108 through the in-coupling grating 116. The in-coupling grating 116 may be polarization-selective, transmitting light of a first polarization state, e.g. a circular polarization of a first handedness, while diffracting light of a second, orthogonal polarization state, e.g. a circular polarization of a second, opposite handedness. The illuminating light beam 110 emitted by the light source 108 may be in the first polarization state, such that the illuminating light beam 110 propagates through the in-coupling grating 116 substantially without diffraction, and impinges onto the tiltable reflector 111. The tiltable reflector 111 redirects the illuminating light beam 110 towards the lightguide 112 at a variable incidence angle. Upon reflection from the tiltable reflector 111, the polarization state of the illuminating light beam 110 changes from the first polarization state to the second polarization state, causing the in-coupling grating 116 to in-couple the illuminating light beam 110 into the lightguide 112 at an angle corresponding to the tilt angle of the tiltable reflector 111. An out-coupling grating 118, which may also be a polarization-selective grating, out-couples parallel portions of the illuminating light beam 110 to illuminate the entire area of the reflective display panel 102. In other words, the lightguide 112 operates as a pupil-replicating lightguide providing multiple offset parallel portions of the illuminating light beam 110 for illumination of the reflective display panel 102. The illuminating light beam 110 portions reflected by the display panel 102 form an image light beam 114 polarized orthogonally to the illuminating light 110, causing the image light beam 114 to propagate through the out-coupling grating 118 towards the objective 106. The objective 106 produces the converging image light beam 115 at the eyebox 136.

The varying angle of the illuminating light beam 110 causes an angle of incidence of the image light beam 114 onto the objective 106 to be varied. The angle of incidence variation translates into a variation of the location of the focused image light beam at the eyebox 136. The controller 140 may tilt the tiltable reflector 111 to make the location of the focused image light beam follow the location of the user's eye 134 pupil 135 in the eyebox 136. For example, when the tiltable reflector 111 is tilted away from its nominal angle, the image light beam 114 shifts as shown with dashed lines 114A to follow a new location 134A of the user's eye 134. It is noted that the tiltable reflector 111 may be tiltable about two axes, i.e. about X- and Y-axes, enabling the converging image light beam 115 to be directed anywhere on XY plane within the eyebox 136.

The display apparatus 100 may be prone to image contrast reduction due to leakage light originating in the lightguide 112 and co-propagating with the image light beam 114. The leakage light acts as a background for the image light beam 114, reducing overall contrast. Referring for an illustration of this effect to FIG. 1B, the display apparatus 100 is shown at the nominal position of the tiltable reflector 111. A leakage light beam 124, e.g. a portion of the illuminating light beam diffracted into a "wrong" diffraction order of the out-coupling grating 118, co-propagates with the image light beam 114 in the direction of Y-axis, and gets focused by the objective 106, forming a converging leakage light beam 125 that enters the pupil 135 of the user's eye 134. This causes contrast reduction and other artifacts of the image observed by the user's eye 134 at the eyebox 136.

Figure 1B:
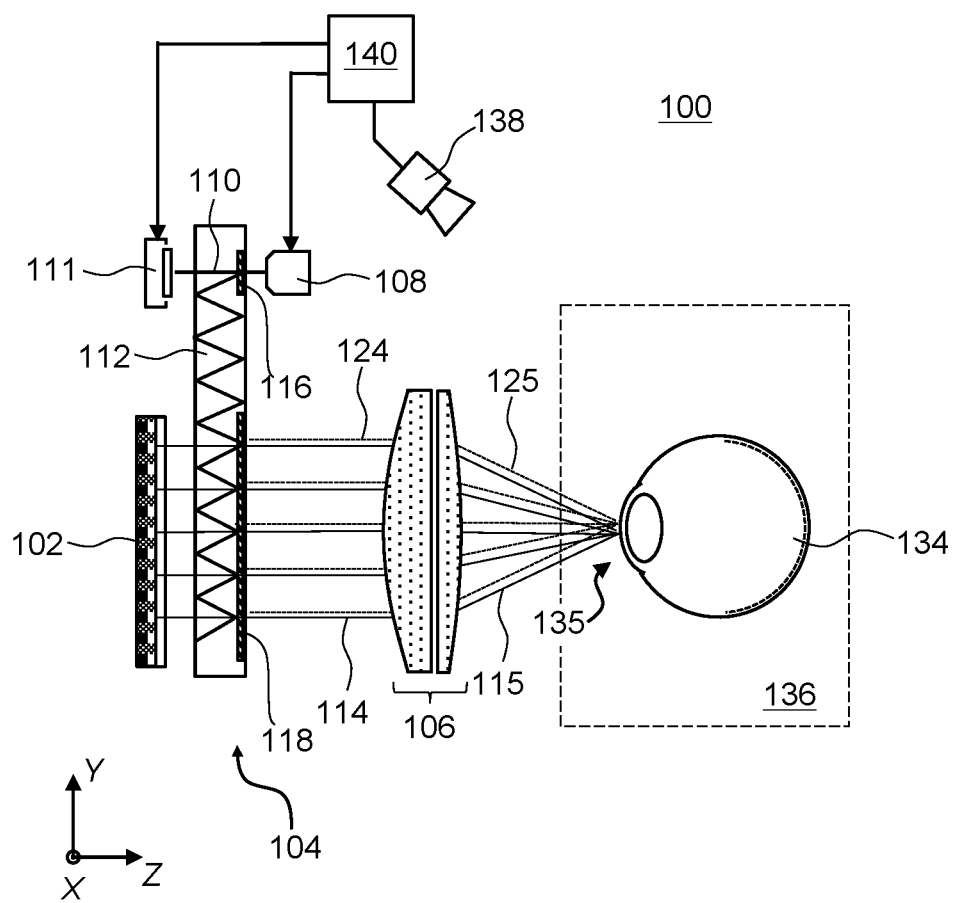
FIG. 1B is a schematic side view of the display apparatus of FIG. 1A at a nominal angle of tilt of the tiltable reflector, illustrating a leakage light propagating path.
Figure 2:
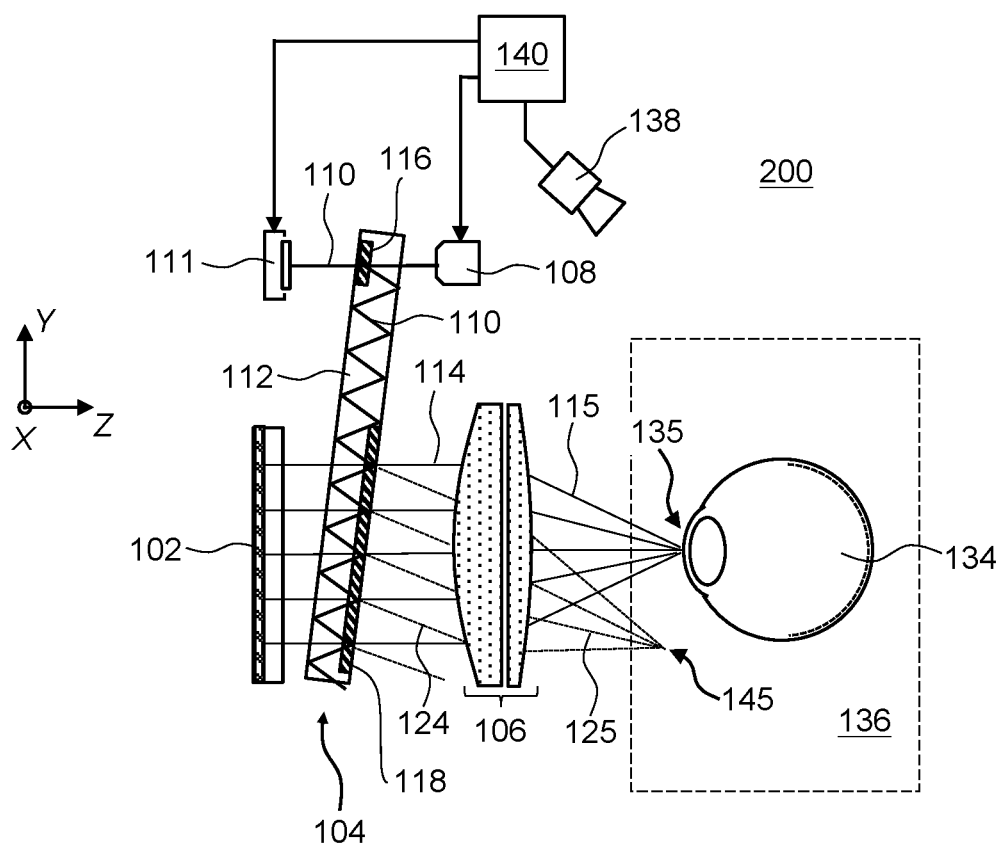
FIG. 2 is a schematic side view of a display apparatus with tilted lightguide for separating paths of the image and leakage light beams.

One exemplary solution to the leakage light problem of the display apparatus 100 of FIGS. 1A and 1B is presented in FIG. 2. A display apparatus 200 of FIG. 2 includes similar elements as the display apparatus 100 of FIGS. 1A and 1B, i.e. the reflective display panel 102, the illuminator 104, the objective 106, and the optional eye tracker 138. The illuminator 104 of the display apparatus 200 includes the light source 108, the optional tiltable reflector 111, and the lightguide 112. The controller 140 of the display apparatus 200 is operably coupled to the light source 108, the tiltable reflector 111, and the eye tracker 138. The controller 140 may be configured to track the eye 134 position/orientation as explained above with reference to FIG. 1A.

The lightguide 112 is tilted relative to the reflective display panel 102. The tilt may be about X-axis as illustrated, about Y-axis, or about both X- and Y-axes. In other words, the reflective display panel and the lightguide are non-parallel to each other.

In operation, the illuminating light beam 110 impinges onto the tiltable reflector 111, gets reflected thereby at a variable angle, is in-coupled into the lightguide 112 by the in-coupling grating 116, propagates in the lightguide 112, gets out-coupled by the out-coupling grating 118 to illuminate the reflective display panel 102, is reflected as the image light beam 114, and is redirected by the objective 106 as the converging image light beam 125. The leakage light beam 124 exiting the lightguide 112 towards the eyebox 136 propagates non-parallel to the image light beam 114; in FIG. 2, the leakage light beam 124 forms an acute angle with the image light beam 114. As a result of this, a focal location 145 of a converging leakage light beam 125 becomes offset from the point of convergence of the converging image light beam 115. The angle of tilt of the lightguide 112 may be selected large enough such that locations of the converging image 115 and leakage 125 light beams at the eyebox 136 do not overlap anywhere at the eyebox 136, i.e. they do not overlap at any angle of tilt of the tiltable reflector 111 following the position of the user's eye 134 in the eyebox 136. Thus, tilting the lightguide 112 by a sufficient angle, e.g. at least 1 degree, at least 2 degrees, at least 4 degrees, or at least 8 degrees, overcomes the problem of the leaking light reducing contrast of an image observed by the user's eye 134.

Figure 3:
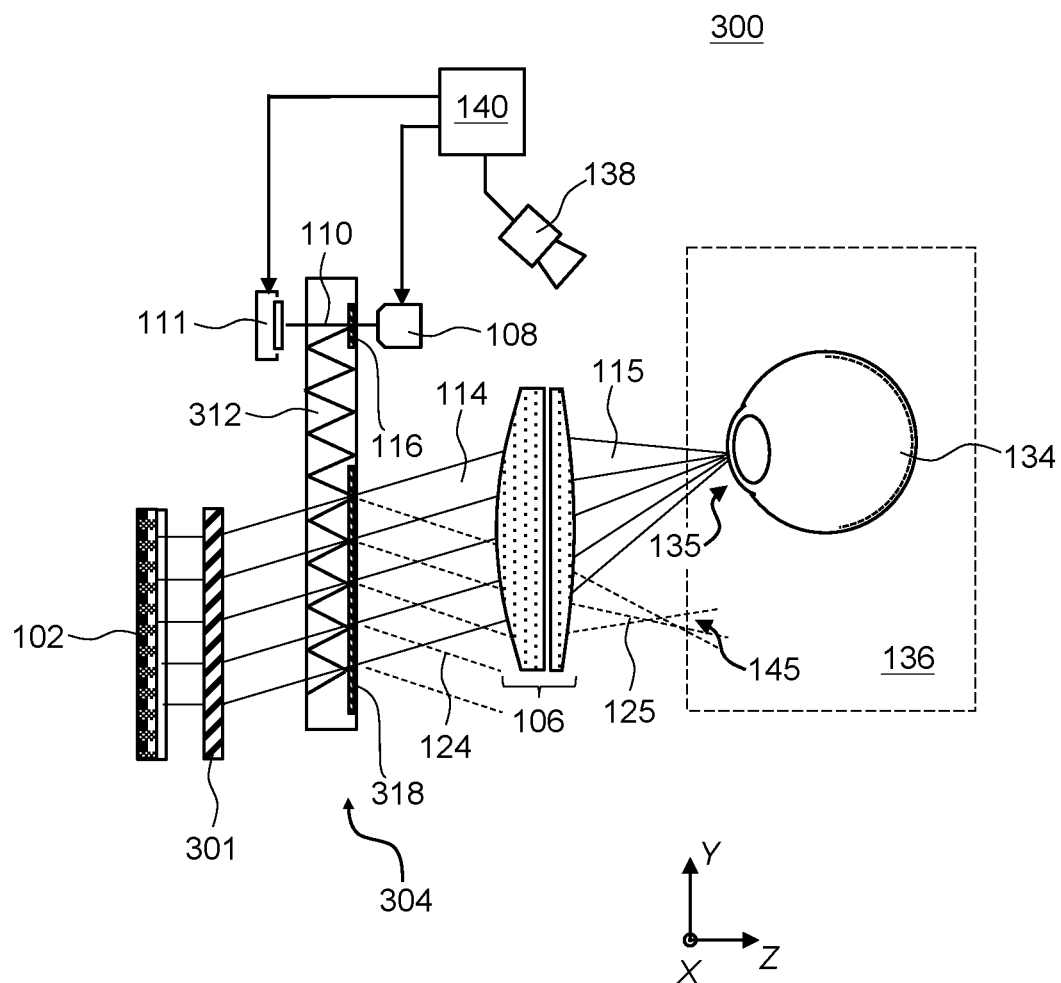
FIG. 3 is a schematic side view of a display apparatus including a reflective display panel illuminated with a lightguide through an external transmissive diffraction grating.

Referring now to FIG. 3, a display apparatus 300 includes similar elements as the display apparatus 100 of FIG. 1A, i.e.

the reflective display panel 102, the objective 106, and the optional eye tracker 138. The display apparatus 300 of FIG. 3 further includes an illuminator 304 having the light source 108, the optional tiltable reflector 111, and a lightguide 312. The lightguide 312 includes the in-coupling grating 116 and an out-coupling grating 318, which operates in a similar manner as the out-coupling grating 118 of the display apparatus 100 of FIG. 1A, but is configured to diffract the illuminating light beam 110 portions e.g. in to a $1^{st}$ order of diffraction, to redirect the portions of the illuminating light beam 110 at a slanted or acute angle when the tiltable reflector 111 is at a nominal or normal angle, as can be seen by comparing FIG. 3 and FIG. 1A. The controller 140 of the display apparatus 300 (FIG. 3) is operably coupled to the light source 108, the tiltable reflector 111, and the eye tracker 138. The controller 140 may be configured to track the eye 134 position and/or orientation.

The display apparatus 300 further includes a transmissive diffraction grating 301 in an optical path between the lightguide 312 and the reflective display panel 102, for redirecting the illuminating light beam 110 portions to impinge onto the reflective display panel 102 at a substantially normal angle when the tiltable reflector 111 is at the illustrated nominal angle and the diffracted portions of the illuminating light beam 110 exit the lightguide at a non-normal angle. The reflected image light beam 114 retraces the portions of the illuminating light beam 110 on the way back to the lightguide 312 due to diffraction by the transmissive diffractive grating 301, and propagates through the out-coupling grating 318 substantially without diffraction by the out-coupling grating 318 towards the objective 106. The objective 106 forms the converging image light beam 115 at the eyebox 136. The leakage light beam 124, which includes the illuminating light beam 110 diffracted into the "wrong" order e.g. into the $-1^{st}$ diffraction order, will propagate non-parallel to the image light beam 114 and consequently will converge to the focal location 145 spaced away from the pupil 135 of the user's eye 134. Since the user's eye 134 will not see the leakage light, the overall perceived image contrast will be improved.

Figure 4:
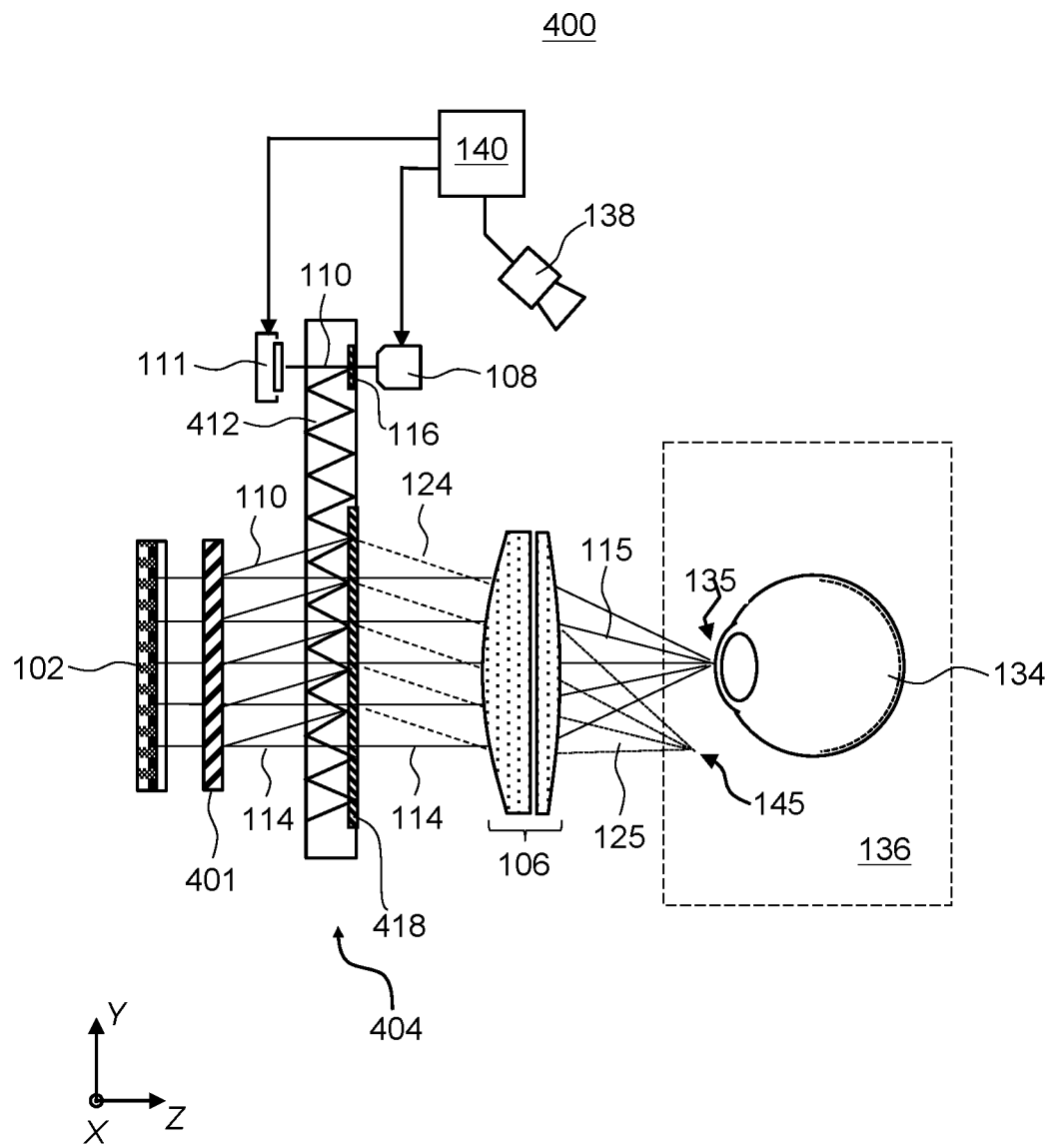
FIG. 4 is a schematic side view of a display apparatus including a reflective display panel illuminated with a lightguide through an external polarization-selective transmissive diffraction grating.

Turning to FIG. 4, a display apparatus 400 includes similar elements as the display apparatus 300 of FIG. 3, i.e. the reflective display panel 102, the objective 106, and the optional eye tracker 138. The display apparatus 400 of FIG. 4 further includes an illuminator 404 having the light source 108, the optional tiltable reflector 111, and a lightguide 412. The lightguide 412 includes the in-coupling grating 116 and the out-coupling grating 418, which may be the same grating as in the display apparatus 300 of FIG. 3. The out-coupling grating 418 is configured to diffract the illuminating light beam 110 portions e.g. in to a $1^{st}$ order of diffraction, to redirect the portions of the illuminating light beam 110 at a slanted or acute angle when the tiltable reflector 111 is at a nominal or normal angle, as can be seen by comparing FIG. 4 and FIG. 1A. The controller 140 of the display apparatus 400 (FIG. 4) is operably coupled to the light source 108, the tiltable reflector 111, and the eye tracker 138. The controller 140 may be configured to track the eye 134 position in a similar manner as explained above with reference to FIG. 1A.

The display apparatus 400 of FIG. 4 further includes a polarization-selective transmissive diffraction grating 401 in an optical path between the lightguide 412 and the reflective display panel 102. The polarization-selective transmissive diffraction grating 401 is configured to redirect impinging light differently depending on a polarization state of the impinging light. The polarization-selective transmissive diffraction grating 401 redirects the illuminating light beam 110 portions in a first polarization state to impinge onto the reflective display panel 102 at a substantially normal angle when the tiltable reflector 111 is at the illustrated nominal angle. The reflected image light beam 114 in a second, orthogonal polarization state propagates straight through the polarization-selective transmissive diffraction grating 401 to the lightguide 412, and propagates through the out-coupling grating 418 of the lightguide 412 substantially without diffraction towards the objective 106. The objective 106 forms the converging image light beam 115 at the eyebox 136. The leakage light beam 124, which includes the illuminating light beam 110 diffracted into the "wrong" order e.g. into the $-1^{st}$ diffraction order, will propagate non-parallel to the image light beam 114 and consequently will converge to the focal location 145 spaced apart from the pupil 135 of the user's eye 134. Since the user's eye 134 will not see the leakage light, the overall perceived image contrast will be improved.

In some embodiments, the reflective display panel 102 operates by changing a polarization state of impinging light. For example, the reflective display panel 102 may be based on a reflective liquid crystal (LC) panel, such as liquid crystal on silicon (LCoS) panel that integrates pixel drivers on the same (silicon) substrate. In some embodiments, the reflective display panel 102 includes an array of tiltable micromirrors. Referring for a non-limiting illustrative example to FIG. 5, a tiltable micromirror 550* of an array 500 of tiltable micromirrors 550 is shown in a magnified view. In an OFF position 551 indicated with a dashed rectangle, the tiltable micromirror 550* redirects an impinging illuminating light beam 510 along a path 511 towards a beam dump 531. In an ON position 552 shown with a solid rectangle, the tiltable micromirror 550* redirects an impinging illuminating light beam 510 along a path 512 parallel to Z-axis, towards an objective 506 and further to an eyebox of the display apparatus. The tiltable micromirrors 550 at their nominal orientations are not parallel to a plane of the array 500. In other words, the tiltable micromirrors 550 form a non-zero angle with a plane of the array 500 (XY plane) in both the ON position 552 and OFF position 551. The tiltable micromirrors 550 may be flippable between the two steady ON and OFF positions. Grayscale levels of a pixel represented by the tiltable micromirror 550* may be obtained by only flipping the tiltable micromirror 550 for only a portion of a frame duration.

Figure 5:
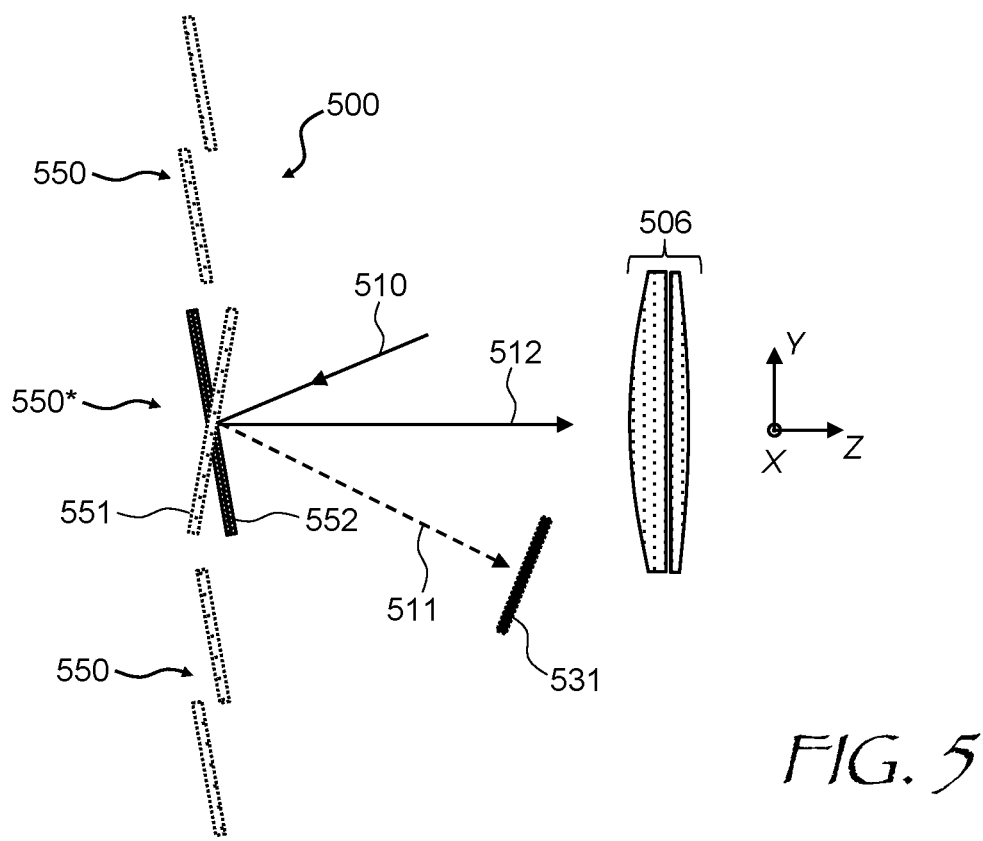
FIG. 5 is a partial view of a reflective display panel comprising an array of tiltable micromirrors usable in a display apparatus of this disclosure.
Figure 6:
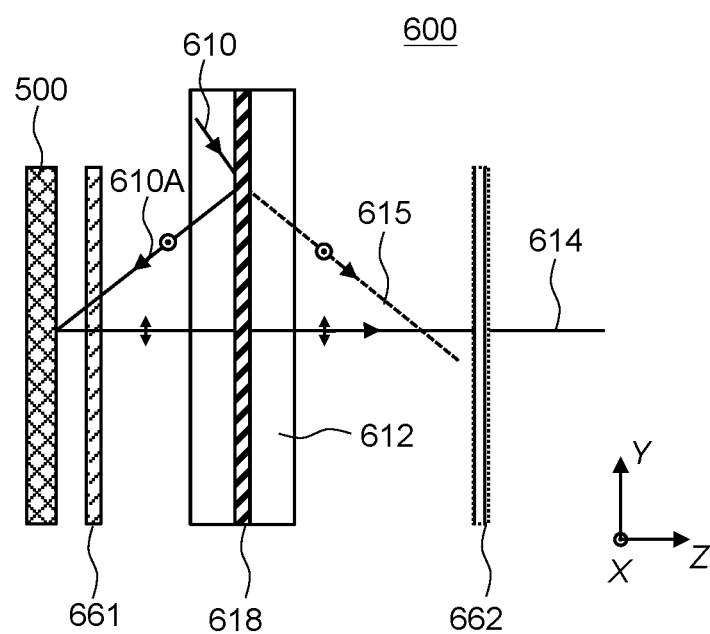
FIG. 6 is a partial side view of an embodiment of a display apparatus including the array of tiltable micromirrors of FIG. 5 with optional polarization suppression of leakage light.

Turning to FIG. 6 with further reference to FIG. 5, a display apparatus 600 is similar to the display apparatus 400 of FIG. 4, including similar elements such as a light source, a controller, an eye tracker, an optional tiltable reflector of illuminating light beam, etc. A lightguide 612 of the display apparatus 600 of FIG. 6 includes a polarization-selective out-coupling grating 618 that diffracts light of a first polarization, e.g. a linear polarization parallel to X-axis, and transmits through light of a second polarization, e.g. a linear polarization parallel to Y-axis.

The display apparatus 600 further includes the array 500 of tiltable micromirrors 550 of FIG. 5. In operation, an illuminating light beam 610 linearly polarized along X-axis propagates in the lightguide 612. A portion 610A of the illuminating light beam 610 is our-coupled, by diffraction, from the lightguide 612. The portion propagates through an optional quarter-wave plate (QWP) 661 and impinges onto the micromirrors 550 of the array 500 of tiltable micromirrors. When the micromirror 550* is in ON state as illustrated in FIG. 5, a reflected image light beam 614 propagates along Z-axis, i.e. horizontally in FIG. 6. The image light beam 614 propagates through the QWP 661 and becomes linearly polarized along Y-axis, propagating through the polarization-selective out-coupling grating 618 of the lightguide 612 substantially without diffraction. The image light beam 614 may then propagate through an optional linear polarizer 662 with the transmission axis oriented along Y-axis.

A leakage light beam 615 formed e.g. by diffraction into a "wrong" diffraction order propagates at an angle to the image light beam 614, forming a focused spot at the eyebox similarly to what was explained above with reference to FIGS. 2-4. The leakage light beam 615 is linearly polarized along X-axis, (the same polarization as the illuminating light beam 610) and as such is additionally attenuated by the linear polarizer 662.

Figure 7:
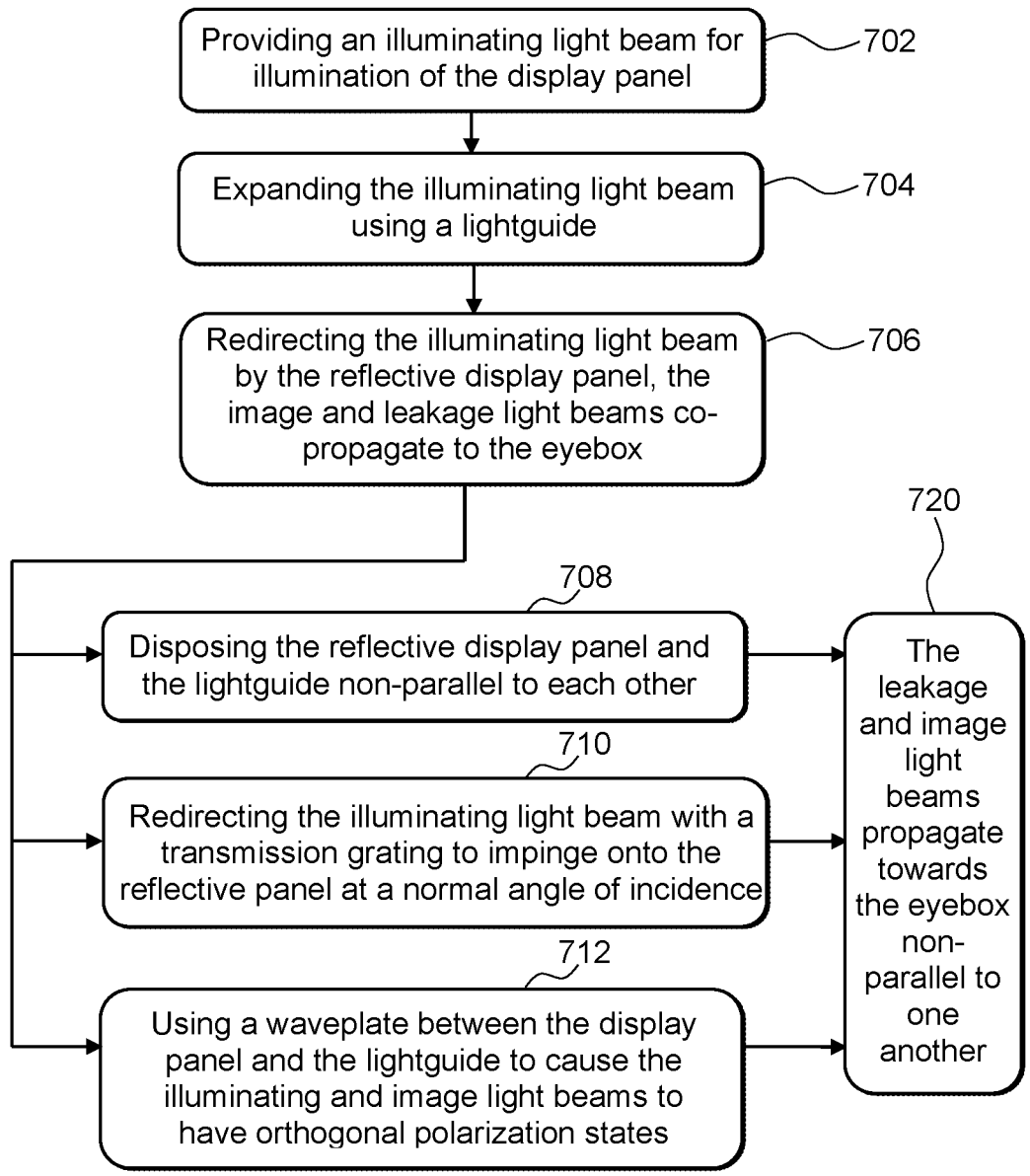
FIG. 7 is a flow chart of a method for illuminating a reflective display panel in accordance with this disclosure.

Referring now to FIG. 7, a method 700 for illuminating a reflective display panel includes providing (702) an illuminating light beam, e.g. the light beam 110 in FIGS. 2-4 generated by the light source 108 and optionally redirected by the tiltable reflector 111, or the illuminating light beam 610 in FIG. 6. The illuminating light beam is expanded (704) across the reflective display panel. The beam expansion may be achieved e.g. using a pupil-replicating lightguide such as the lightguide 112 of FIG. 2, the lightguide 312 of FIG. 3, the lightguide 412 of FIG. 4, and/or the lightguide 612 of FIG. 6. The illuminating light beam is redirected (FIG. 7; 706) by the reflective display panel thereby forming an image light beam that propagates through the lightguide. The leakage light beam formed in the lightguide from the illuminating light beam co-propagates with the image light beam away from the lightguide and towards an eyebox of the display apparatus. As was explained above with reference to FIGS. 2-6, the leakage and image light beams propagate towards the eyebox non-parallel to one another (720), whereby locations of the image and leakage light beams at the eyebox do not overlap anywhere at the eyebox, at any tilt angle of the tiltable reflector if present.

The non-parallelism of the image and leakage light beams may be achieved e.g. by disposing (708) the reflective display panel 102 and the lightguide 112 non-parallel to each other (FIG. 2). The non-parallelism of the image and leakage light beams may also be achieved e.g. by redirecting (FIG. 7; 710) the illuminating light beam using a transmission diffraction grating (e.g. 301 in FIG. 3, 401 in FIG. 4) to impinge onto the reflective display panel 102 at a substantially normal angle. A waveplate may be disposed between the reflective display panel and the lightguide to cause (FIG. 7; 712) the illuminating and image light beams to have mutually orthogonal polarization states, whereby the leakage and image light beams have mutually orthogonal polarization states, enabling the leakage light beam to be further attenuated by a suitable polarizer disposed downstream of the lightguide.

Figure 8:
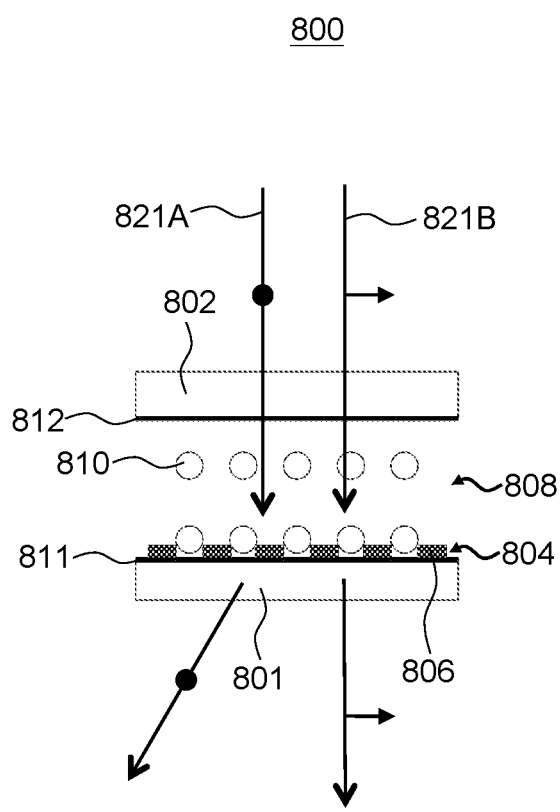
FIG. 8 is a side cross-sectional view of a liquid crystal (LC) surface-relief grating of this disclosure.

Examples of polarization-selective transmission diffraction gratings usable as out-coupling and/or redirecting gratings in the display apparatuses of FIGS. 2-4 and FIG. 6 will now be considered. Referring first to FIG. 8, a liquid crystal (LC) surface-relief grating 800 may be used e.g. as the polarization-selective out-coupling grating 618 of FIG. 6. The LC surface-relief grating 800 includes a first substrate 801 supporting a first alignment layer 811 and a surface-relief grating structure 804 having a plurality of ridges 806 extending from the first substrate 801 and/or the first alignment layer 811.

A second substrate 802 is spaced apart from the first substrate 801. The second substrate 802 supports a second alignment layer 812. A cell is formed between the first 811 and second 812 alignment layers. The cell is filled with a LC fluid, forming an LC layer 808. The LC layer 808 includes nematic LC molecules 810, which may be oriented by the first 811 and second 812 alignment layers along the ridges or grooves of the surface-relief grating structure 804.

The surface-relief grating structure 804 may be formed from a polymer with an isotropic refractive index $n_p$ of about 1.5, for example. The LC fluid has an anisotropic refractive index. For light polarization parallel to a director of the LC fluid, i.e. to the direction of orientation of the nematic LC molecules 810, the LC fluid has an extraordinary refractive index $n_e$, which may be higher than an ordinary refractive index $n_o$ of the LC fluid for light polarization perpendicular to the director. For example, the extraordinary refractive index $n_e$ may be about 1.7, and the ordinary refractive index $n_o$ may be about 1.5, i.e. matched to the refractive index $n_p$ of the surface-relief grating structure 804.

A linearly polarized light beam 821A with e-vector oriented along the grooves of the surface-relief grating structure 804 will undergo diffraction, since the surface-relief grating structure 804 will have a non-zero refractive index contrast. For a linearly polarized light beam 821B with e-vector oriented perpendicular to the grooves of the surface-relief grating structure 804, no diffraction will occur because at this polarization of the linearly polarized light beam 821B, the surface-relief grating structure 804 are index-matched. Thus, the LC surface-relief grating 800 is selective w.r.t. the direction of linear polarization of impinging light. At one direction of linear polarization (i.e. e-vector of the electromagnetic light field), the LC surface-relief grating 800 diffracts light, and at the other, perpendicular direction, LC surface-relief grating 800 substantially does not diffract light.

Figure 9A:
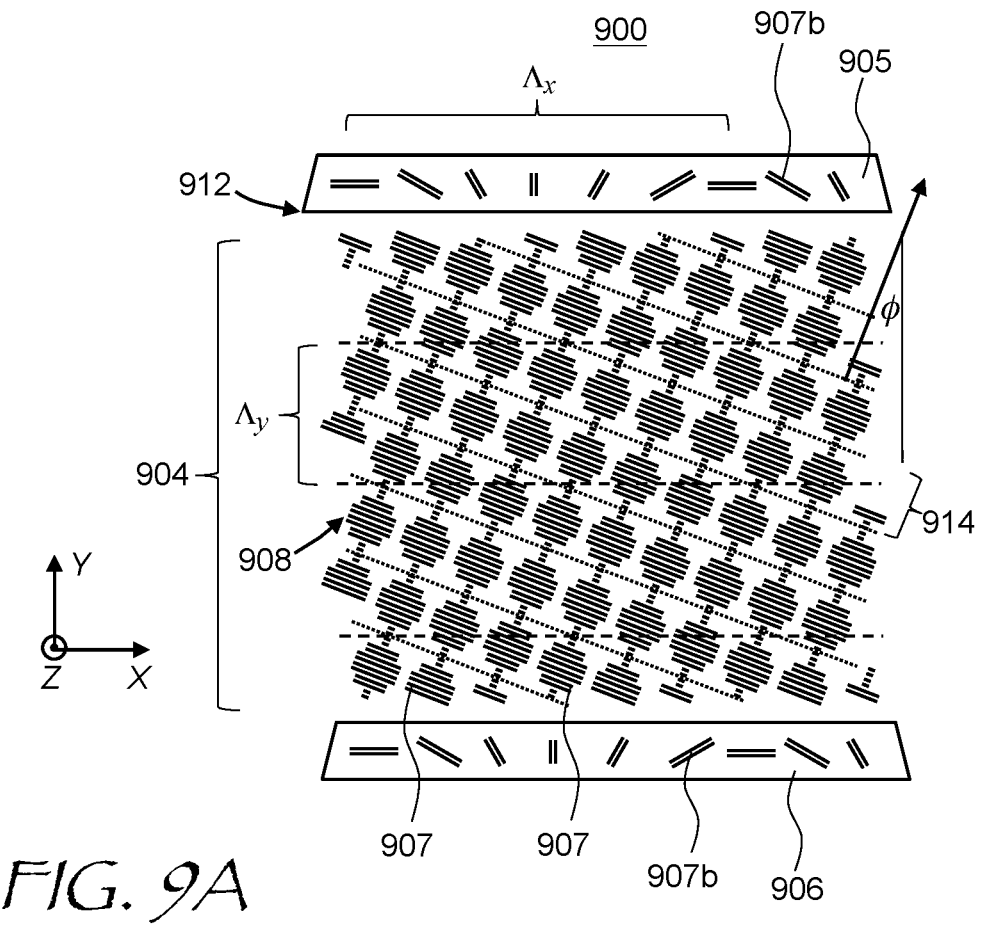
FIG. 9A is a side cross-sectional view of a polarization volumetric grating (PVH) usable in a lightguide of this disclosure.

Referring now to FIG. 9A, a polarization volume hologram (PVH) grating 900 may be used e.g. as the out-coupling grating 118 of the lightguide 112 of FIGS. 1A, 1B, FIG. 2, the out-coupling grating 318 of the lightguide 312 of FIG. 3, and/or the out-coupling grating 418 of the lightguide 412 of FIG. 4. The PVH grating 900 of FIG. 9A includes an LC layer 904 bound by opposed top 905 and bottom 906 parallel surfaces. The LC layer 904 may include an LC fluid containing rod-like LC molecules 907 with positive dielectric anisotropy, i.e. nematic LC molecules. A chiral dopant may be added to the LC fluid, causing the LC molecules in the LC fluid to self-organize into a periodic helical configuration including helical structures 908 extending between the top 905 and bottom 906 parallel surfaces of the LC layer 904. Such a configuration of the LC molecules 907, termed herein a cholesteric configuration, includes a plurality of helical periods p, e.g. at least two, at least five, at least ten, at least twenty, or at least fifty helical periods p between the top 905 and bottom 906 parallel surfaces of the LC layer 904.

Boundary LC molecules 907b at the top surface 905 of the LC layer 904 may be oriented at an angle to the top surface 905. The boundary LC molecules 907b may have a spatially varying azimuthal angle, e.g. linearly varying along X-axis parallel to the top surface 905, as shown in FIG. 9A. To that end, an alignment layer 912 may be provided at the top surface 905 of the LC layer 904. The alignment layer 912 may be configured to provide the desired orientation pattern of the boundary LC molecules 907b, such as the linear dependence of the azimuthal angle on the X-coordinate. A pattern of spatially varying polarization directions of the UV light may be selected to match a desired orientation pattern of the boundary LC molecules 907b at the top surface 905 and/or the bottom surface 906 of the LC layer 904. When the alignment layer 912 is coated with the cholesteric LC fluid, the boundary LC molecules 907b are oriented along the photopolymerized chains of the alignment layer 912, thus adopting the desired surface orientation pattern. Adjacent LC molecules adopt helical patterns extending from the top 905 to the bottom 906 surfaces of the LC layer 904, as shown.

The boundary LC molecules 907b define relative phases of the helical structures 908 having the helical period p. The helical structures 908 form a volume grating comprising helical fringes 914 tilted at an angle φ, as shown in FIG. 9A. The steepness of the tilt angle φ depends on the rate of variation of the azimuthal angle of the boundary LC molecules 907b at the top surface 905 and p. Thus, the tilt angle φ is determined by the surface alignment pattern of the boundary LC molecules 907b at the alignment layer 912. The volume grating has a period $\Lambda_x$ along X-axis and $\Lambda_y$ along Y-axis. In some embodiments, the periodic helical structures 908 of the LC molecules 907 may be polymer-stabilized by mixing in a stabilizing polymer into the LC fluid, and curing (polymerizing) the stabilizing polymer.

Figure 9B:
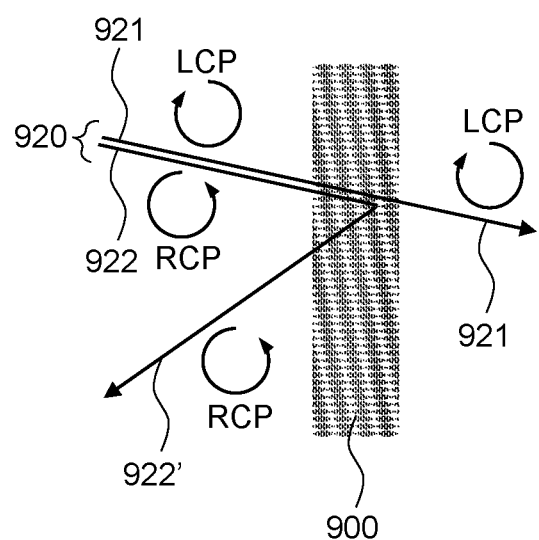
FIG. 9B is a diagram illustrating optical performance of the PVH of FIG. 9A.

The helical nature of the fringes 914 of the volume grating makes the PVH grating 900 preferably responsive to light of polarization having one particular handedness, e.g. left- or right-circular polarization, while being substantially non-responsive to light of the opposite handedness of polarization. Thus, the helical fringes 914 make the PVH grating 900 polarization-selective, causing the PVH grating 900 to diffract light of only one handedness of circular polarization. This is illustrated in FIG. 9B, which shows a light beam 920 impinging onto the PVH grating 900. The light beam 920 includes a left circular polarized (LCP) beam component 921 and a right circular polarized (RCP) beam component 922. The LCP beam component 921 propagates through the PVH grating 900 substantially without diffraction. Herein, the term "substantially without diffraction" means that, even though an insignificant portion of the beam (the LCP beam component 921 in this case) might diffract, the portion of the diffracted light energy is so small that it does not impact the intended performance of the PVH grating 900. The RCP beam component 922 of the light beam 920 undergoes diffraction, producing a diffracted beam 922'. The polarization selectivity of the PVH grating 900 results from the effective refractive index of the grating being dependent on the relationship between the handedness, or chirality, of the impinging light beam and the handedness, or chirality, of the grating fringes 914. It is further noted that sensitivity of the PVH 900 to right circular polarized light in particular is only meant as an illustrative example. When the handedness of the helical fringes 914 is reversed, the PVH 900 may be made sensitive to left circular polarized light. Thus, the operation of the PVH 900 may be controlled by controlling the polarization state of the impinging light beam 920.

Figure 10:
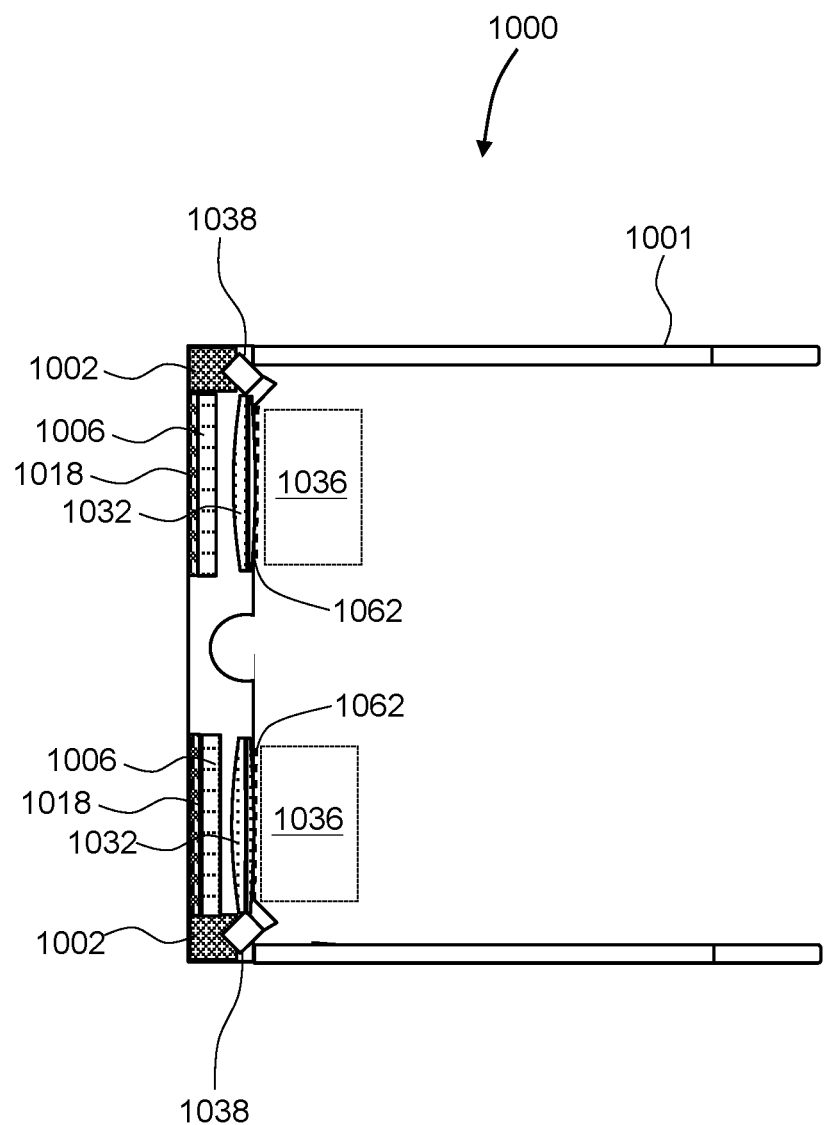
FIG. 10 is a view of an augmented reality (AR) display of this disclosure having a form factor of a pair of eyeglasses.

Referring to FIG. 10, a virtual reality (VR) near-eye display (NED) 1000 is one possible implementation of the display apparatus 100 of FIGS. 1A and 1B, the display apparatus 200 of FIG. 2, the display apparatus 300 of FIG. 3, the display apparatus 400 of FIG. 4, or the display apparatus 600 of FIG. 6. The VR NED 1000 includes a frame 1001 supporting, for each eye: a light source 1002 including a tiltable reflector for varying a beam angle of an emitted light beam as disclosed herein; a pupil-replicating lightguide 1006 for guiding the light beam inside and out-coupling portions of the light beam as disclosed herein; a display panel 1018 illuminated by the light beam portions out-coupled from the pupil-replicating lightguide 1006 for spatially modulating the light beam portions; an objective, projection lens, or ocular lens 1032 for converting an image in linear domain displayed by the display panel 1018 into an image in angular domain at an eyebox 1036 as disclosed herein; an eye-tracking camera 1038; and a plurality of eyebox illuminators 1062, shown as black dots. The eyebox illuminators 1062 may be supported by ocular lens 1032 for illuminating an eyebox 1036.

The purpose of the eye-tracking cameras 1038 is to determine position and/or orientation of both eyes of the user to enable steering the output image light to the locations of the user's eyes as disclosed herein. The illuminators 1062 illuminate the eyes at the corresponding eyeboxes 1036, to enable the eye-tracking cameras 1038 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1062, the light illuminating the eyeboxes 1036 may be made invisible to the user. For example, infrared light may be used to illuminate the eyeboxes 1036.

Figure 11:
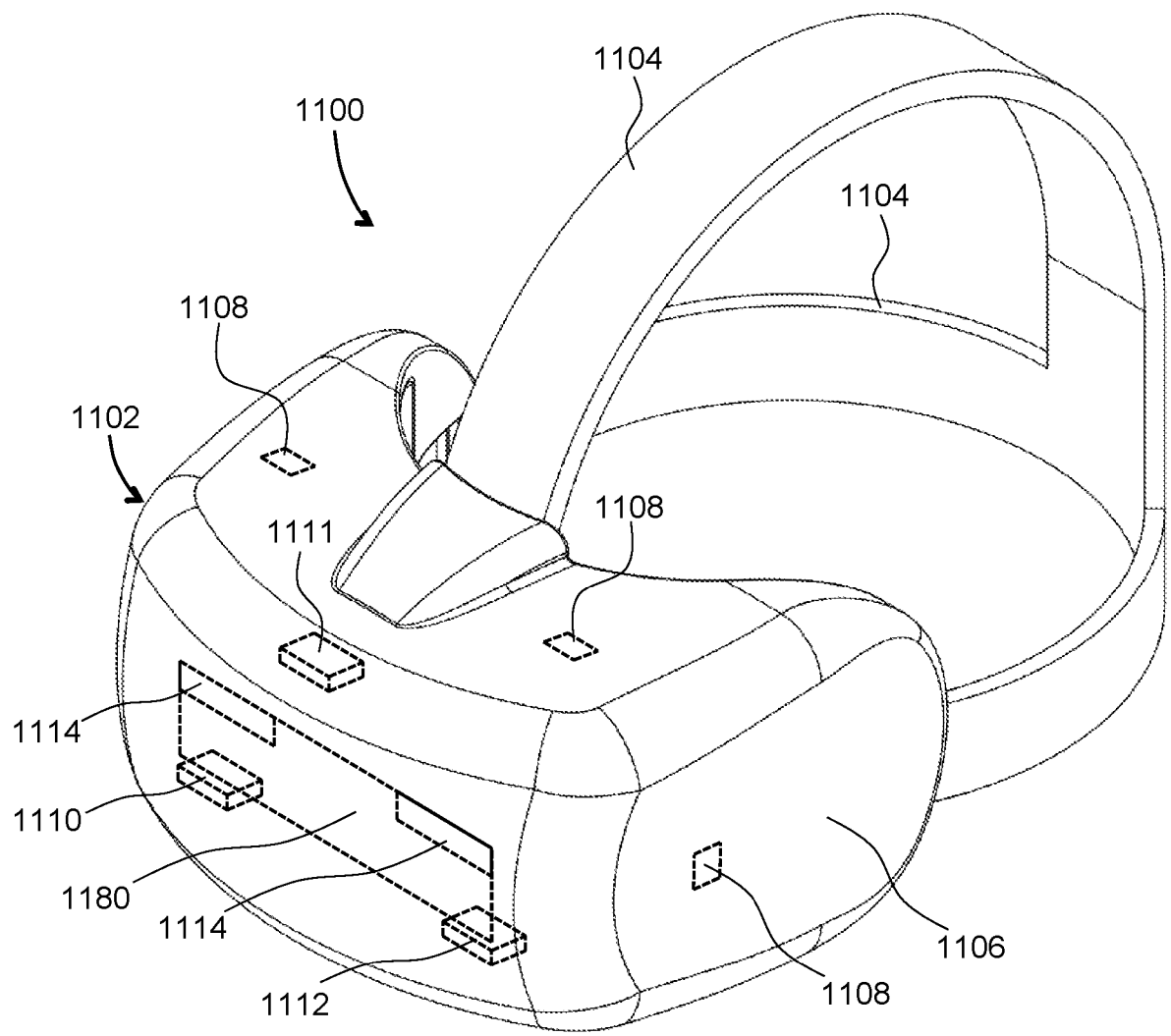
FIG. 11 is a three-dimensional view of a head-mounted display (HMD) of this disclosure.

Turning to FIG. 11, an HMD 1100 is an example of an AR/VR wearable display system which encloses the user's face, for a greater degree of immersion into the AR/VR environment. The HMD 1100 may generate the entirely virtual 3D imagery. The HMD 1100 may include a front body 1102 and a band 1104 that can be secured around the user's head. The front body 1102 is configured for placement in front of eyes of a user in a reliable and comfortable manner. A display system 1180 may be disposed in the front body 1102 for presenting AR/VR imagery to the user. The display system 1180 may include any of the display apparatuses disclosed herein. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. The determined gaze direction and vergence angle may be used to adjust the display system 1180 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display apparatus comprising:
    a reflective display panel;
    an illuminator comprising:
        a light source for providing an illuminating light beam; and
        a lightguide for expanding the illuminating light beam across the reflective display panel, which reflects the illuminating light beam thereby forming an image light beam that propagates through the lightguide, wherein a leakage light beam formed in the lightguide from the illuminating light beam co-propagates with the image light beam away from the lightguide and towards an eyebox of the display apparatus; and
    an objective for receiving the image light beam propagated through the lightguide for forming an image at the eyebox;
    wherein the illuminator is configured to direct the leakage light beam exiting the lightguide towards the eyebox to propagate non-parallel to the image light beam, whereby locations of the image and leakage light beams at the eyebox do not overlap anywhere at the eyebox.

2. The display apparatus of claim 1, wherein the reflective display panel and the lightguide are non-parallel to each other.

3. The display apparatus of claim 1, wherein the illuminator further comprises a transmissive diffraction grating in an optical path between the lightguide and the reflective display panel, for redirecting the illuminating light beam to impinge onto the reflective display panel at a substantially normal angle.

4. The display apparatus of claim 3, wherein:
    the transmissive diffraction grating is configured to redirect light differently depending on a polarization state of impinging light;
    the illuminating light beam is in a first polarization state; and
    the image light beam is in a second, orthogonal polarization state.

5. The display apparatus of claim 1, wherein the reflective display panel comprises a liquid crystal panel.

6. The display apparatus of claim 1, wherein the reflective display panel comprises an array of tiltable micromirrors.

7. The display apparatus of claim 6, wherein the array of tiltable micromirrors is disposed parallel to the lightguide while the tiltable micromirrors at their nominal orientations are not parallel to a plane of the array of tiltable micromirrors.

8. The display apparatus of claim 6, wherein the illuminator further comprises a waveplate between the reflective display panel and the lightguide, for causing the illuminating and image light beams to have mutually orthogonal polarization states, whereby the leakage and image light beams have mutually orthogonal polarization states.

9. The display apparatus of claim 8, further comprising a polarizer downstream of the lightguide, for attenuating the leakage light beam while propagating the image light beam towards the objective.

10. The display apparatus of claim 1, wherein the lightguide comprises a pupil-replicating lightguide.

11. The display apparatus of claim 10, wherein the pupil-replicating lightguide comprises an in-coupling grating for in-coupling the illuminating light beam into the pupil-replicating lightguide, and an out-coupling grating for out-coupling parallel portions of the illuminating light beam out of the pupil-replicating lightguide, thereby expanding the illuminating light beam across the reflective display panel.

12. The display apparatus of claim 11, wherein the out-coupling grating is configured to diffract light of a first polarization state and to not diffract light of a second, orthogonal polarization state.

13. The display apparatus of claim 1, further comprising a tiltable reflector in an optical path between the light source and the lightguide, for receiving the illuminating light beam from the light source and redirecting the illuminating light beam towards the lightguide at a variable incidence angle, thereby varying an angle of incidence of the image light beam onto the objective and a location of the image light beam at the eyebox, wherein the locations of the image and leakage light beams at the eyebox do not overlap at any angle of tilt of the tiltable reflector.

14. The display apparatus of claim 13, further comprising:
an eye tracker for determining a position a user's eye pupil at the eyebox; and
a controller operably coupled to the eye tracker and the tiltable reflector for directing the image light beam to the position of the user's eye pupil.

15. A method for illuminating a reflective display panel, the method comprising:
providing an illuminating light beam;
expanding an illuminating light beam across the reflective display panel using a lightguide; and
reflecting the illuminating light beam by the reflective display panel thereby forming an image light beam that propagates through the lightguide, wherein a leakage light beam formed in the lightguide from the illuminating light beam co-propagates with the image light beam away from the lightguide and towards an eyebox;
wherein the leakage and image light beams propagate towards the eyebox non-parallel to one another, whereby locations of the image and leakage light beams at the eyebox do not overlap anywhere at the eyebox.

16. The method of claim 15, further comprising disposing the reflective display panel and the lightguide non-parallel to each other.

17. The method of claim 15, further comprising redirecting, using a transmission diffraction grating, the illuminating light beam to impinge onto the reflective display panel at a substantially normal angle.

18. The method of claim 15, further comprising using a waveplate disposed between the reflective display panel and the lightguide to cause the illuminating and image light beams to have mutually orthogonal polarization states, whereby the leakage and image light beams have mutually orthogonal polarization states.

\* \* \* \* \*